United States Patent
Wu et al.

(10) Patent No.: US 8,094,982 B2
(45) Date of Patent: Jan. 10, 2012

(54) FIBER LENS ASSEMBLY FOR OPTICAL DEVICE

(75) Inventors: Xuehua Wu, Union City, CA (US);
Haijun Yuan, Pleasanton, CA (US);
Younsheng Liu, San Jose, CA (US);
Christopher Lin, El Cerrito, CA (US);
Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 338 days.

(21) Appl. No.: 12/014,728

(22) Filed: Jan. 15, 2008

(65) Prior Publication Data

US 2008/0219619 A1    Sep. 11, 2008

Related U.S. Application Data

(60) Provisional application No. 60/893,872, filed on Mar. 8, 2007.

(51) Int. Cl.
*G02B 6/32* (2006.01)
*G02B 6/42* (2006.01)

(52) U.S. Cl. .......................................... 385/33; 385/31
(58) Field of Classification Search .............. 385/31, 385/33
See application file for complete search history.

(56) References Cited

U.S. PATENT DOCUMENTS

| | | | |
|---|---|---|---|
| 5,420,416 A * | 5/1995 | Iida et al. ............ | 250/201.1 |
| 6,320,996 B1 | 11/2001 | Scobey et al. | |
| 6,563,977 B1 * | 5/2003 | Chen et al. ............ | 385/24 |
| 6,594,082 B1 | 7/2003 | Li et al. | |
| 6,757,113 B1 | 6/2004 | Basavanhally et al. | |
| 6,825,981 B2 * | 11/2004 | Takushima et al. ........ | 359/566 |
| 7,019,883 B2 * | 3/2006 | Moon et al. ............ | 359/290 |
| 7,126,696 B2 * | 10/2006 | Tobiason ............ | 356/499 |
| 7,257,288 B1 * | 8/2007 | Strasser et al. ............ | 385/24 |
| 7,408,639 B1 * | 8/2008 | Strasser et al. ............ | 356/328 |
| 2002/0018621 A1 * | 2/2002 | Park ................ | 385/37 |
| 2002/0176149 A1 * | 11/2002 | Davis et al. ............ | 359/290 |
| 2002/0176151 A1 * | 11/2002 | Moon et al. ............ | 359/298 |
| 2003/0190121 A1 * | 10/2003 | Luo et al. ............ | 385/37 |
| 2004/0076368 A1 * | 4/2004 | Takushima et al. ........ | 385/18 |
| 2005/0036202 A1 * | 2/2005 | Cohen et al. ............ | 359/495 |
| 2005/0073749 A1 * | 4/2005 | Helbing et al. ............ | 359/566 |
| 2006/0244973 A1 * | 11/2006 | Yun et al. ............ | 356/511 |
| 2009/0027689 A1 * | 1/2009 | Yun et al. ............ | 356/511 |

FOREIGN PATENT DOCUMENTS

| | | |
|---|---|---|
| EP | 1 523 212 | 4/2005 |
| EP | 14232122 A2 * | 5/2009 |

OTHER PUBLICATIONS

EP Search Report for Application No. EP 08 15 2468 dated Jul. 30, 2008.

* cited by examiner

*Primary Examiner* — Kaveh Cyrus Kianni
(74) *Attorney, Agent, or Firm* — Patterson & Sheridan, L.L.P.

(57) ABSTRACT

A fiber lens assembly is configured to optically couple an optical fiber to a signal processing device having free-space optical elements. The fiber lens assembly includes a diverging lens having a focal length that may be around 2 to 6 times the diameter of the optical fiber core. Sensitivity of the fiber lens assembly to angular misalignment and positional displacement is reduced by coupling the optical fiber to the signal processing device using a diverging lens rather than a collimating lens, and by configuring the diverging lens with a suitable focal length.

19 Claims, 7 Drawing Sheets

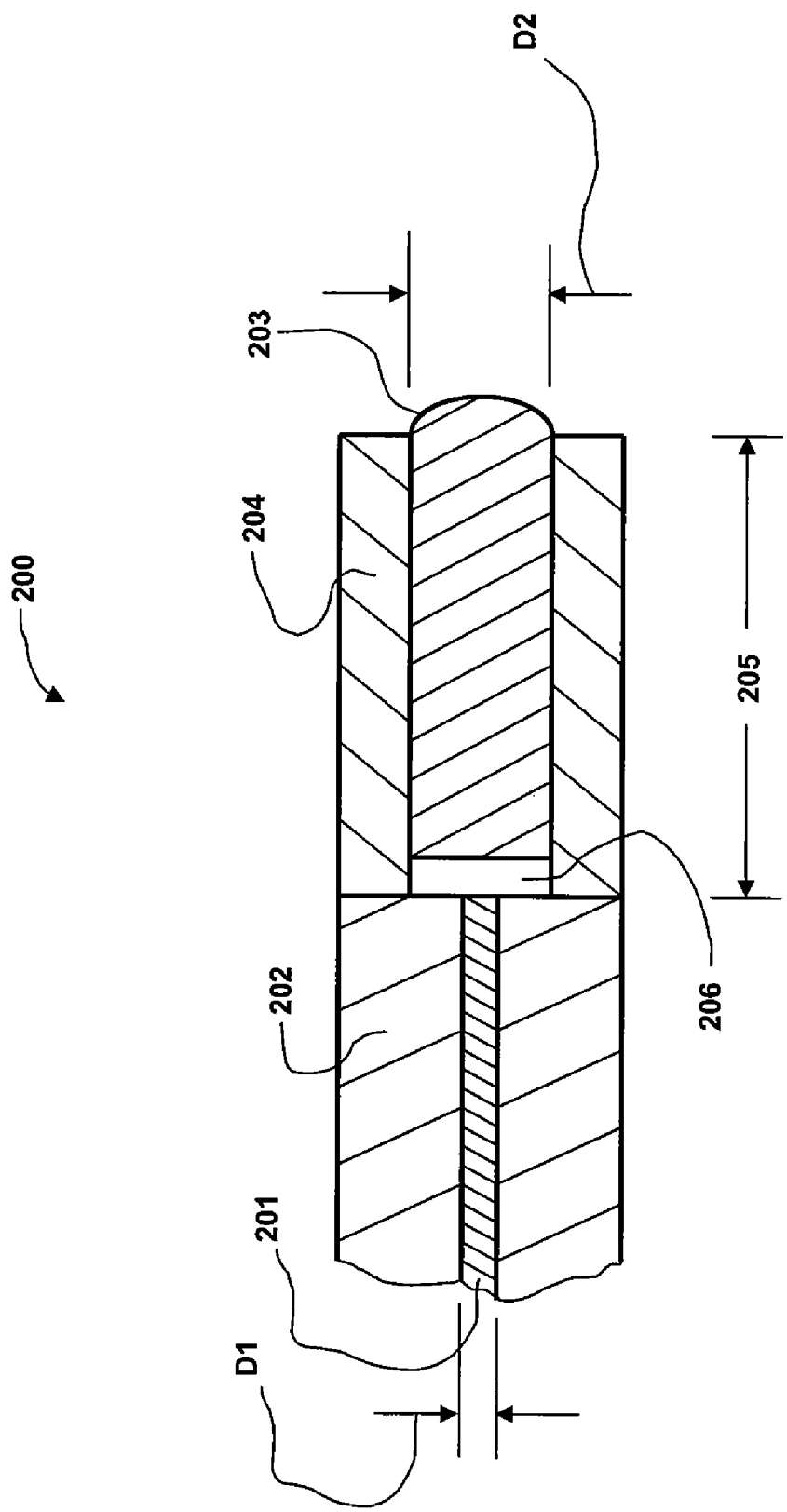

FIBER LENS ASSEMBLY FOR OPTICAL DEVICE

CROSS-REFERENCE TO RELATED APPLICATIONS

This application claims the benefit of U.S. Provisional Patent Application Ser. No. 60/893,872, filed Mar. 8, 2007, entitled "Wavelength Selective Liquid Crystal Switch," the entire contents of which are incorporated by reference herein.

BACKGROUND OF THE INVENTION

1. Field of the Invention

Embodiments of the present invention relate generally to optical communication systems and, more particularly, to a fiber lens assembly and an optical device having a fiber lens assembly.

2. Description of the Related Art

In optical fiber-based communications systems, optic fibers are coupled to various signal processing devices for switching, attenuation, and broadcasting functions. These devices include wavelength selective switches (WSSs), optical add-drop multiplexers (OADMs), dynamic gain equalizers (DGEs) and wavelength selective routers, among others.

An optical fiber is a cylindrical dielectric waveguide that transmits light along its axis by the process of total internal reflection. The fiber consists of a core surrounded by a cladding layer, where the core makes up the light-transmitting portion of the fiber and is generally on the order of about 10 micrometers in diameter. Relative to other optical components of a WSS, OADM, or DGE, which are generally free-space optical components, the fiber core is orders of magnitude smaller. Because the fiber core has such a small diameter, precise placement of the fiber in relation to the other optical elements of a device is necessary for the fiber to be optically coupled thereto. For example, if the optical fiber for an output port is displaced by only a few micrometers from the optical axis of an outgoing light beam, a substantial portion of the outgoing light beam will not be incident on the core of the fiber, resulting in significant signal loss. In fact, if the displacement between the fiber and the optical axis of the outgoing light beam is greater the radius of the fiber core, none of outgoing signal will reach the output fiber. Therefore, even a very small positional displacement of an optical fiber, e.g., five micrometers, can produce serious signal loss. Misalignment between the optical axis of an outgoing light beam and a fiber may occur when the fiber is initially coupled to an optical device, or as a result of drift. Drift is generally caused by the small relative motion between the components of an optical switching device that occurs due to thermal expansion and/or contraction of the optical switching device during operation.

Another source of signal loss in optical switching devices is the angular displacement between the ideal alignment of a fiber coupled to an optical switching device and the actual alignment of the fiber. As with positional displacement, angular displacement may be introduced during installation of the fiber and/or via thermal expansion/contraction of the optical switching device during operation. Collimated light beams, which are generally used in WSSs, OADMs, and other optical switching devices, are particularly sensitive to angular misalignment issues.

FIG. 1A schematically illustrates the sensitivity of a collimated light beam to angular misalignment of a fiber lens assembly by comparing fiber lens assemblies 100A and 100B. Fiber lens assembly 100A is centered on and aligned parallel to an ideal optical axis 103. Fiber lens assembly 100A includes an optical fiber 101 and a collimating lens 102, and produces a collimated light beam 110A. Because fiber lens assembly 100A has ideal angular and positional alignment with ideal optical axis 103, collimated light beam 110A is coincident with ideal target region 105 as the beam crosses an image plane 104. Ideal target region 105 corresponds to a critical region or optical element of an optical switching device that requires precise alignment of an incident light beam, such as an aperture, diffraction grating, mirror, or optical steering device. Misalignment of the beam with ideal target region 105 results in signal loss and/or poor performance of a signal processing device coupled to fiber lens assembly 110A.

Fiber lens assembly 100B is substantially identical to fiber lens assembly 110A, except that fiber lens assembly 100B produces a collimated light beam 110B, which is centered on optical axis 103B. Optical axis 103B has an angular displacement θ from ideal optical axis 103, where angular displacement θ may be caused by imprecise installation of fiber lens assembly 100B, or by mechanical drift, thermal expansion, etc. As shown in FIG. 1A, although optical fiber 101 of fiber lens assembly 100B is positionally centered on ideal optical axis 103, angular displacement θ of fiber lens assembly 100B causes collimated light beam 110B to cross image plane 104 at region 105B instead of ideal target region 105. In this example, angular displacement E results in more than half of collimated light beam 110B missing ideal target region 105. In general, a small angular misalignment of fiber lens assembly 100B can produce large signal loss, particularly when the distance 106 between collimating lens 102 and image plane 104 is much larger than the diameter 107 of the collimated light beam.

Angular misalignment and/or drift of optical elements can also produce high losses at an output port of an optical switching device. FIG. 1B schematically illustrates a typical output port 120 of an optical switching device. Output port 120 includes an optical fiber tip 121 and a focusing lens 122. Output port 120 is configured to receive a collimated light beam at focusing lens 122 and focus the beam onto optical fiber tip 121. Beam 123 is a collimated light beam incident on output port 120 that is aligned with an ideal optical axis 124, and therefore is completely focused onto optical fiber tip 121 without any signal loss. Beam 125 is a collimated light beam that has a small angular misalignment θ125 with ideal optical axis 124. As a result, the focal point of beam 125 is altered as shown by a displacement H from ideal optical axis 124, and is not directed entirely onto optical fiber tip 121, resulting in significant signal loss. For larger angular misalignments, displacement H may be greater than the radius of optical fiber tip 121, e.g., five or more micrometers, resulting in essentially 100% signal loss. Because focal length L of optical output port 120 is typically several orders of magnitude greater than the diameter of optical fiber tip 121, even small angular misalignment of an incident light beam with optical output port 120 will produce a relatively large displacement H and an associated signal loss.

Accordingly, there is a need in the art for a robust means of coupling an optical fiber to signal processing devices used in communications networks that is less sensitive to positional and angular alignment over prior art means.

SUMMARY OF THE INVENTION

Embodiments of the present invention generally provide a fiber lens assembly configured to optically couple an optical fiber to a wavelength division multiplexing (WDM) signal processing device having free-space optical elements.

In a first embodiment, a fiber lens assembly comprises an optical fiber for receiving a WDM signal and a diverging lens proximate the optical fiber, for optically coupling the optical fiber with another optical element, the diverging lens having the same optical axis as the optical fiber, a diameter that is greater than a diameter of the optical fiber, and a focal length that is no more than two orders of magnitude greater than the diameter of the optical fiber. The fiber lens assembly may be implemented in an input port for a WDM signal processing device, and the diameter of the diverging lens may be about 2 to 6 times greater than the diameter of the optical fiber.

In another embodiment, an optical device for processing a WDM signal comprises a light dispersing element for separating the WDM signal into its wavelength components and combining wavelength components of a WDM signal into the WDM signal, and a fiber lens assembly with an optical fiber and a diverging lens proximate the optical fiber, wherein the diverging lens is configured and positioned to optically couple the optical fiber and the light dispersing element.

In another embodiment, a wavelength selective switch comprises input and output ports, each including a fiber lens assembly with an optical fiber and a diverging lens proximate the optical fiber, a light dispersing element optically coupled to the input and output ports, and an optical switch. The optical switch receives wavelength components of an input light beam from the light dispersing element, alters the optical paths of the wavelength components of the input light beam, and directs the wavelength components of the input light beam to the light dispersing element after their optical paths have been altered.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A schematically illustrates a cross-sectional view of a fiber lens assembly, according to an embodiment of the invention.

For clarity, identical reference numerals have been used, where applicable, to designate identical elements that are common between figures. It is contemplated that features of one embodiment may be incorporated in other embodiments without further recitation.

DETAILED DESCRIPTION

Figure 1A:
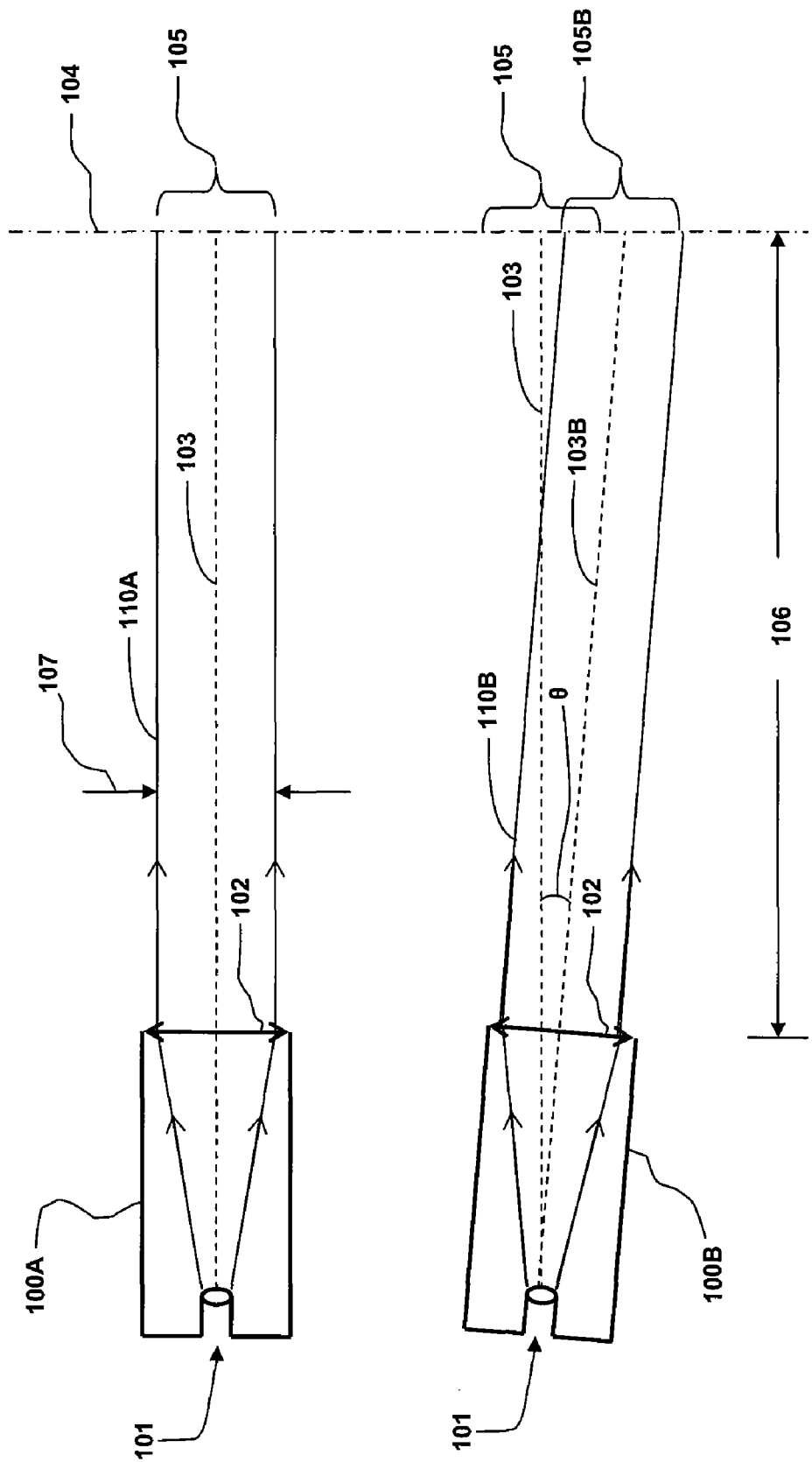
FIG. 1A schematically illustrates the sensitivity of a collimated light beam to angular misalignment of a fiber lens assembly.
Figure 1B:
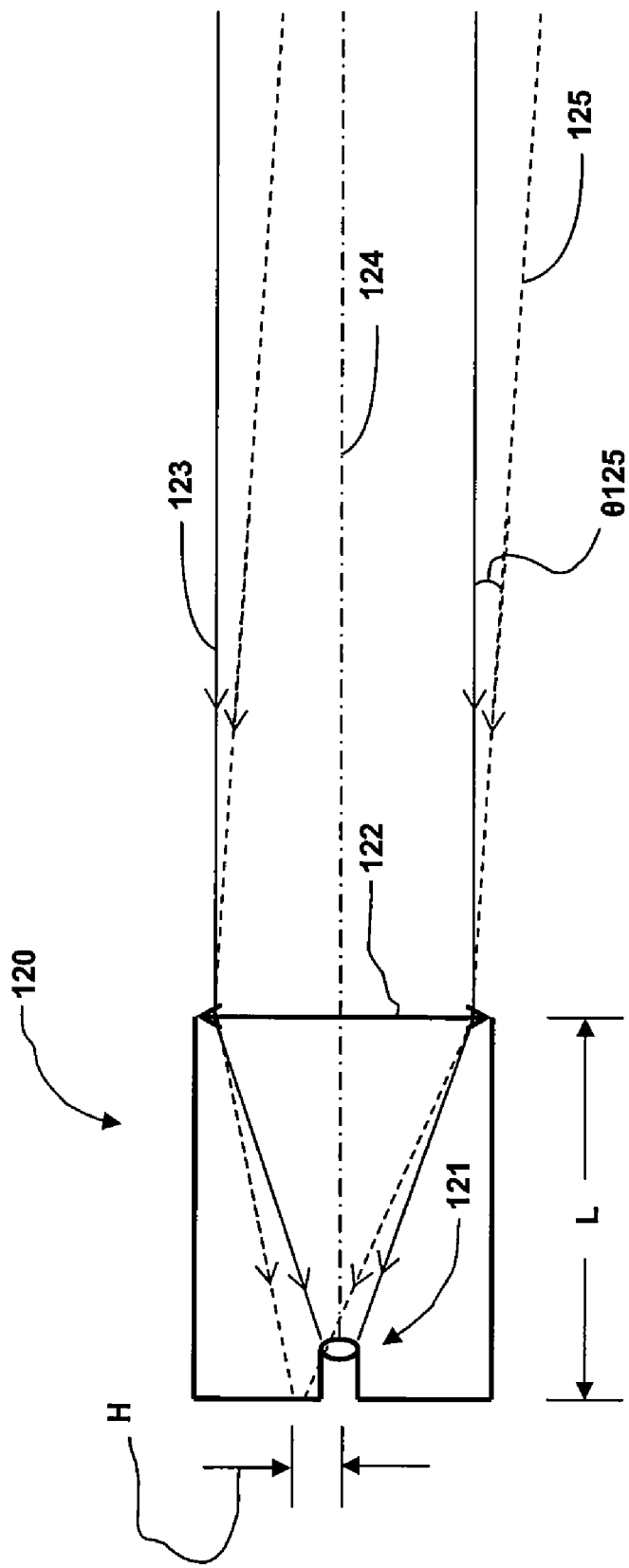
FIG. 1B schematically illustrates a typical output port of an optical switching device.

Embodiments of the invention contemplate a fiber lens assembly configured to optically couple an optical fiber to a signal processing device having free-space optical elements. Sensitivity of the fiber lens assembly to angular misalignment and positional displacement is reduced by optically coupling the fiber to the signal processing device using a diverging lens rather than a collimating lens, and by optimizing the focal length of the fiber lens assembly.

FIG. 2A schematically illustrates a cross-sectional view of a fiber lens assembly according to an embodiment of the invention. Fiber lens assembly 200 includes an optic fiber tip consisting of a core 201 housed in cladding 202. Fiber lens assembly 200 also includes a lens element 203 positioned in a lens sheath 204. Core 201 has a diameter D1, and lens element 203 is configured with a focal length 205 and a diameter D2. In this embodiment, diameter D1 is on the order of 10 micrometers, focal length 205 is no more than two orders of magnitude greater than diameter D1, and diameter D2 is 2 to 6 times diameter D1. In this example, diameter D2 is 30 to 50 micrometers, and focal length 205 is about 0.5 mm. To minimize insertion loss of fiber lens assembly 200, an alignment gap 206 may be present between core 201 and lens element 203.

In operation, fiber lens assembly 200 optically couples core 201 with one or more free-space optical elements of a signal processing device contained in an optical communications network, such as a WSS, OADM, or DGE. Fiber lens assembly 200 may serve as an input port or an output port for such a device. As an input port, fiber lens assembly 200 converts the optical signal contained in core 201 into a free-space divergent light beam for subsequent processing, and as an output port, fiber lens assembly 200 directs a free-space convergent light beam into core 201.

Figure 2B:
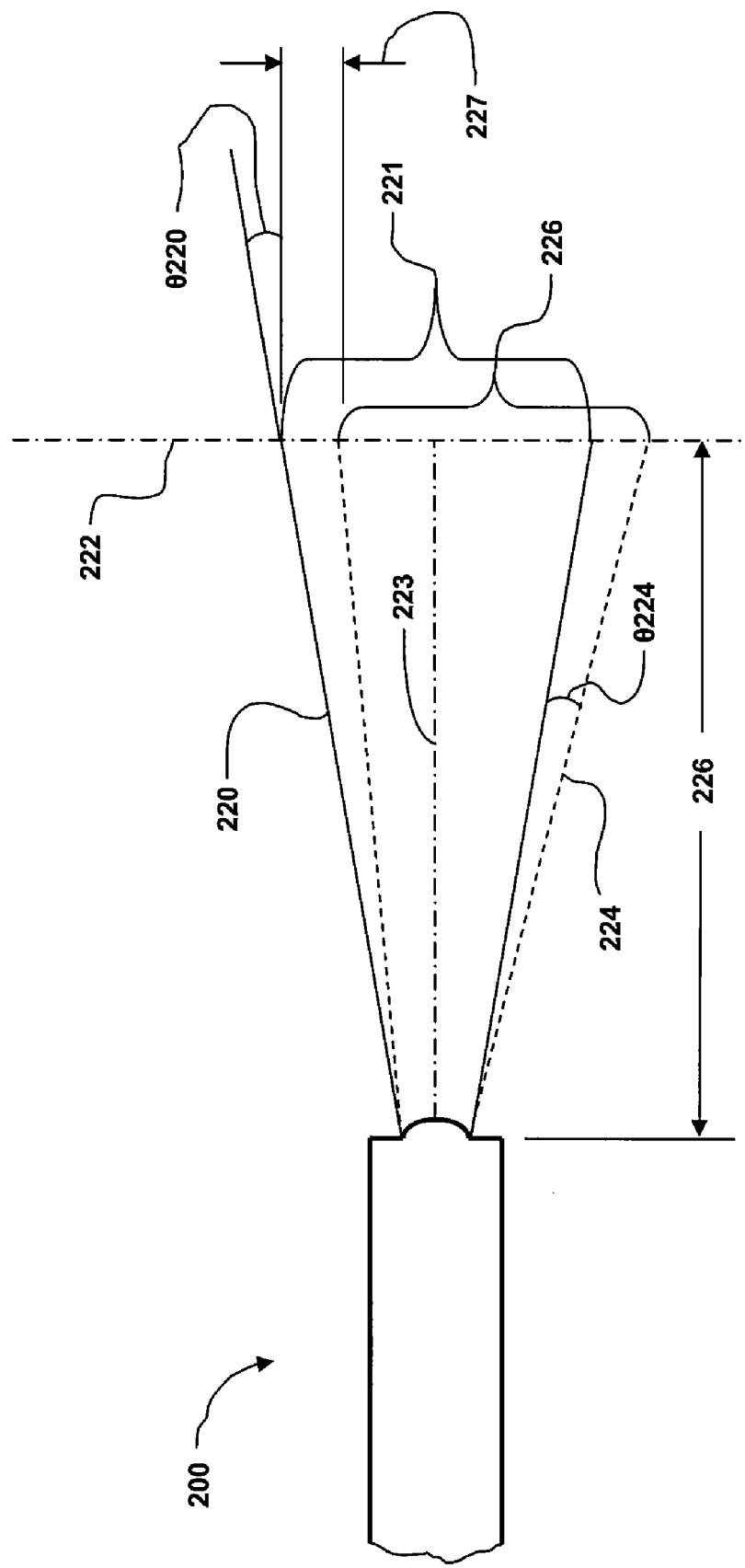
FIG. 2B illustrates a fiber lens assembly serving as an input port for a signal processing device, according to an embodiment of the invention.

FIG. 2B illustrates fiber lens assembly 200 configured as an input port for a signal processing device, according to an embodiment of the invention. Fiber lens assembly 200 projects a free-space divergent light beam 220 onto ideal target region 221, located on image plane 222. Ideal target region 221 corresponds to the location of a diffraction grating, lens, mirror, or other optical element of the signal processing device that requires precise alignment of an incident light beam, i.e., divergent beam 220, for minimal signal loss. Divergent light beam 220 is projected from fiber lens assembly 200 with a divergence angle θ220, where divergence angle θ220 is optimized based on a number of factors, including the size of ideal target region 221 and the distance 225 between fiber lens assembly 200 and image plane 222. In the example illustrated, fiber lens assembly 200 is centered on ideal optical axis 223. Because of this, divergent light beam 220 crosses a region of image plane 222 that coincides with ideal target region 221, and no signal loss occurs.

If angular misalignment θ224 is present between fiber lens assembly 200 and ideal optical axis 223, then fiber lens assembly 200 directs a divergent light beam 224 toward image plane 222, where divergent beam 224 has angular displacement θ224 from divergent light beam 220, as shown. In this case, divergent light beam 224 intersects with image plane 222 at a region 225 that is offset from ideal target region 221 by distance 227. Region 225 does not entirely coincide with ideal target region 221, therefore some signal loss occurs. However, since divergent light beam 224 is not a collimated light beam, signal loss is not a strong function of angular displacement. For example, even if angular displacement θ224 is equal to divergence angle θ220, a significant portion of divergent light beam 224 will be coincident with ideal target region 221. In addition, because divergent beam 224 is not a collimated beam, signal loss stemming from angular misalignment of fiber lens assembly 200 does not increase when distance 226 between fiber lens assembly 200 and image plane 222 increases.

Figure 2C:
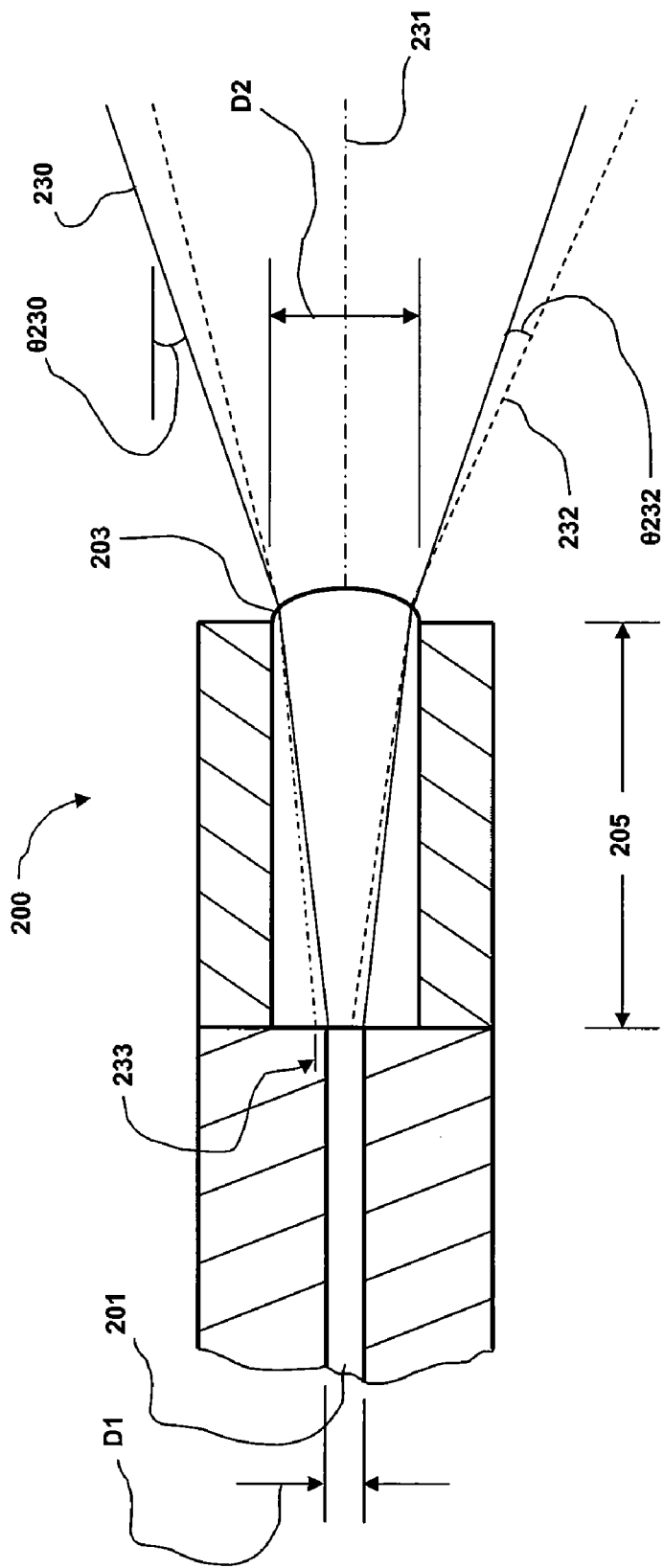
FIG. 2C illustrates a fiber lens assembly serving as an output port for a signal processing device, according to an embodiment of the invention.

FIG. 2C illustrates fiber lens assembly 200 configured as an output port for a signal processing device. A free-space convergent light beam 230 is projected onto fiber lens assembly 200, which inserts the beam into core 201 for transmission to other regions of an optical network. Convergent light beam 230 has a convergence angle θ230, which is selected based on a number of factors related to the geometrical relationship between fiber lens assembly 200 and the signal processing device optically coupled thereto. With convergent light beam 230 centered on ideal optical axis 231, convergent light beam 230 is focused directly onto core 201 by lens element 203 with essentially no insertion loss. If angular misalignment θ232 is present between fiber lens assembly 200 and ideal optical axis 231, then lens element 203 directs convergent light beam 232 toward core 201 but displaced a distance 233 from optimum, as shown. In this case, some insertion loss occurs, since a portion of convergent light beam 232 is not directed into core 201. But because focal length 205 is no more than two orders of magnitude larger than diameter D1 of core 201, distance 233 is small relative to diameter D1 for most angular displacements of convergent light beam 232, and the majority of the beam is inserted into core 201. Hence, fiber lens assembly 200 has a relatively low sensitivity to angular misalignment when used as an output port.

In addition, because diameter D2 of lens element 203 is significantly larger than diameter D1 of core 201, fiber lens assembly 200 is also relatively insensitive to positional displacement. For example, if convergent light beam 230 is vertically displaced 10 micrometers relative to ideal optical axis 231, the majority of the beam will still be inserted into core 201. In contrast, for a prior art fiber lens assembly, in which the diameter of the lens element is approximately the same as that of the fiber core, a 10 micrometer displacement of convergent light beam 230 will result in 100% insertion loss, since the beam will completely miss the lens element.

Figure 3:
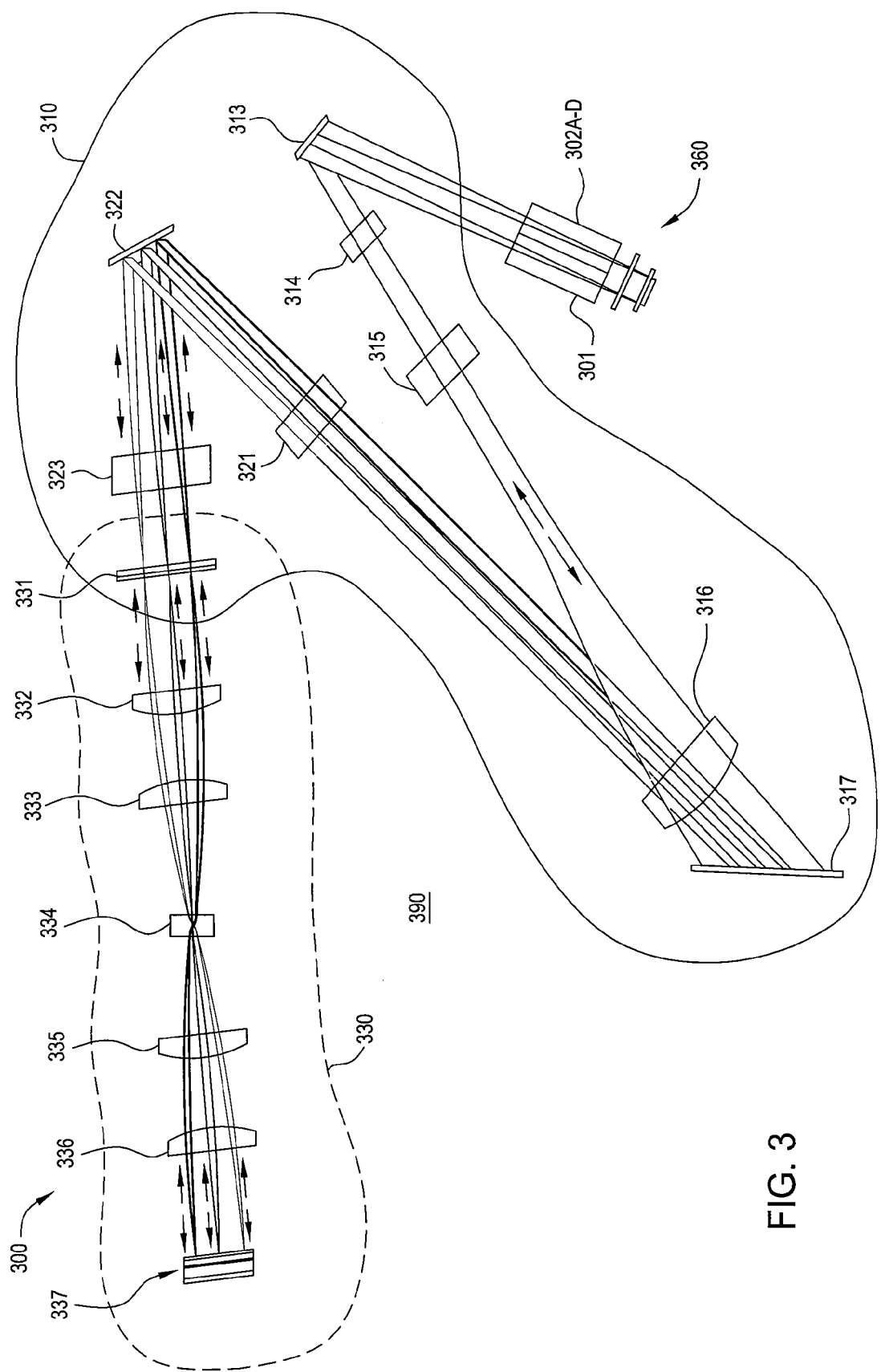
FIG. 3 is a vertical plan view of an optical switching device configured with multiple fiber lens assemblies, according to an embodiment of the invention.

FIG. 3 is a vertical plan view of an optical switching device configured with multiple fiber lens assemblies, according to an embodiment of the invention. WSS 300 is a 1×4 wavelength selective switch and includes an optical input/output assembly 360, a base unit 310, and a switching optics assembly 330. The components of WSS 300 are mounted on a planar surface 390 that is herein defined as the horizontal plane for purposes of description, and which serves as a support structure and optical datum plane for the components of WSS 300.

Because WSS 300 is configured to perform 1×4 routing of WDM wavelength channels, optical input/output assembly 360 optically couples a single WDM optical input signal from a communications network to WSS 300 and four optical output signals from WSS 300 back to the communications network. Optical input/output assembly 360 includes multiple fiber lens assemblies to perform the optical coupling between WSS 300 and the communications network. Optical input/output assembly 360 includes one input port 301 and four output ports 302A-D, where input port 301 and output ports 302A-D are fiber lens assemblies substantially similar to fiber lens assembly 200, described above in conjunction with FIG. 2A.

Base unit 310 is made up of a plurality of free-space optical elements, including a folding mirror 313, beam steering unit 314, cylindrical lenses 315 and 316, a light dispersing element 317, a folding mirror 322, cylindrical lens 321, a focusing lens 323, and a beam polarization unit 331. Light dispersing element 317 may be a diffraction grating or an arrayed waveguide grating. Base unit 310 optically couples optical input/output assembly 360 with switching optics assembly 330. In directing inbound light beams from input port 301 to switching optics assembly 330, base unit 310 shapes, separates, and focuses inbound light beams onto beam polarization unit 331. In directing outbound light beams back to optical input/output assembly 360, base unit 310 recombines, shapes, and directs outbound light beams to one or more of optical output ports 302A-D contained in optical input/output assembly 360.

Switching optics assembly 330 performs switching, attenuation, or other desired functions on an optical input signal, and includes a liquid crystal (LC) based beam polarization unit 331, collimating lenses 332, 333, a beam steering unit 334, collimating lenses 335, 336, and an LC-based beam displacer assembly 337. Beam steering unit 334 may be a birefringent crystal or a Wollaston prism. The elements of switching optics assembly 330 are optically linked to enable the optical routing of a WDM optical input signal entering optical input port 301 to any one of the optical output ports 302A-D. The optical routing is performed by conditioning (via LC polarization) and vertically displacing inbound beams to produce outbound beams having a desired vertical position and polarization state. Switching optics assembly 330 selectively determines the vertical displacement of the outbound beams to correspond to the vertical position of the desired output port, i.e., optical output port 302A, 302B, 302C, or 302D, hence performing a 1.times.4 optical switching operation.

Because WSS 300 is optically coupled to a communications network with one or more fiber lens assemblies according to embodiments of the invention, signal loss associated with such unwanted positional displacement is significantly reduced or eliminated. In addition, by incorporating multiple fiber lens assemblies into a single structure, i.e., optical input/output assembly 360, the effect of positional errors associated with installation of a fiber lens assembly onto WSS 300 can be minimized. Namely, vertical irregularities on planar surface 390 may produce unwanted positional displacement between an input port and an output port. Although planar surface 390 acts as a datum plane, and is therefore assumed to be very flat, it is known in the art that any substrate cannot be perfectly so. Therefore, by incorporating input port 301 and output ports 302A-D into a single assembly, positional errors caused by vertical irregularities on planar surface 390 are minimized. For example, if input port 301 and output port 302A are each mounted in different locations on substrate 303, one may be positioned on a relative high spot on planar surface 390 and the other on a relative low spot on planar surface 390, thereby compounding the variation in flatness of planar surface 390. In so doing, significant vertical positional error may be produced, which may adversely affect the alignment of input port 301 and output port 302A to base unit 310 and to each other.

In a similar fashion, other WDM signal processing devices, such as optical add-drop multiplexers or dynamic gain equalizers, may also benefit when optically coupled to a communications network via one or more fiber lens assemblies, according to embodiments of the invention. In so doing, a WDM signal processing device is less sensitive to precise alignment and positioning of optical input and output ports to the optical axis of the device.

Figure 4:
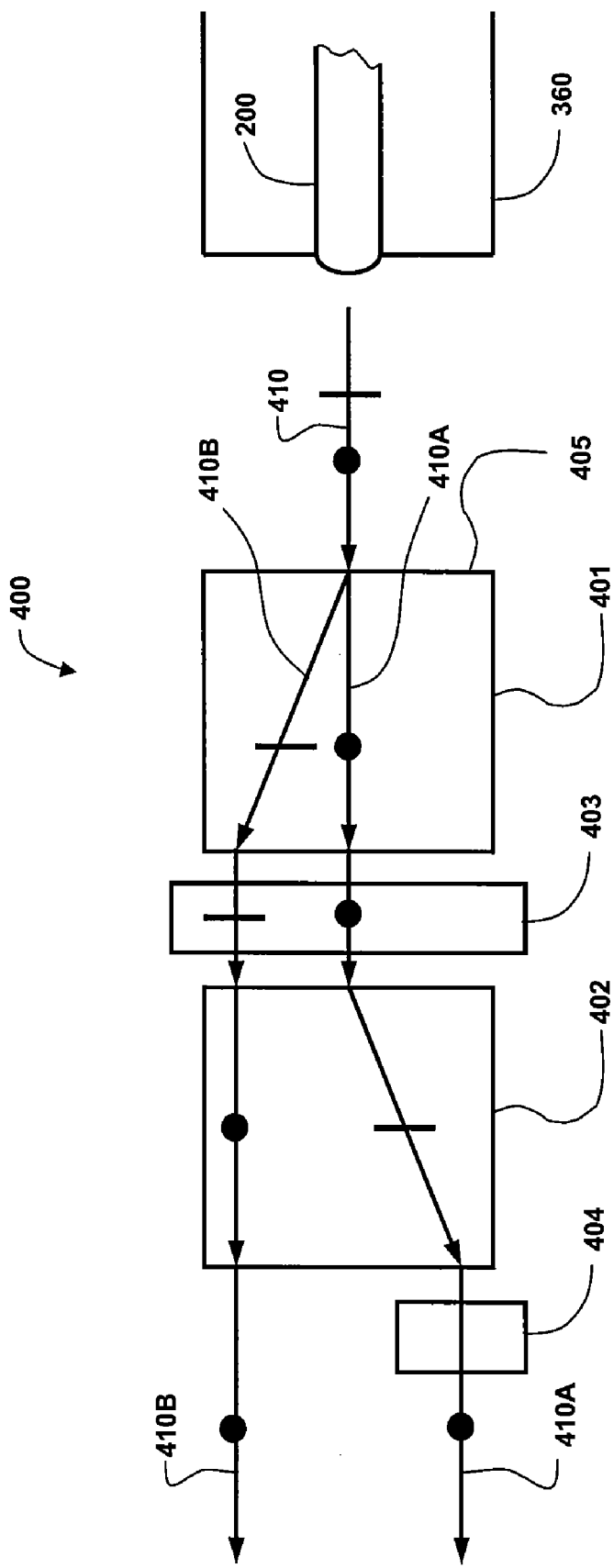
FIG. 4 schematically illustrates an optical input/output assembly coupled to a polarization management optics assembly, according to an embodiment of the invention.

In one embodiment, optical input/output assembly 360 is coupled to a polarization management optics assembly 400, as illustrated schematically in FIG. 4. Polarization management optics assembly 400 receives an optical input signal 410 from a fiber lens assembly 200 contained in optical input/output assembly 360, where optical input signal 410 corresponds to a WDM optical signal that is directed to WSS 300 in FIG. 3 from a communications network. Because the polarization state of optical input signal 410 may be arbitrary and/or unknown, polarization management optics assembly 400 adjusts the polarization of the WDM optical input signal to a single, known state, i.e., linearly polarized in a known direction.

Polarization management optics assembly 400 includes a first birefringent beam displacer 401, a second birefringent beam displacer 402, a full-sized half-wave plate 403, and a half-sized half-wave plate 404, arranged as shown in FIG. 4. First birefringent beam displacer 401 and second birefringent beam displacer 402 are optical components that have a different refractive index depending on the polarization state of incident light, such as a $YVO_4$ cube. Consequently, the s-polarized and p-polarized components of a light beam follow different paths when passing through first birefringent beam displacer 401 and second birefringent beam displacer 402. When a light beam passes through either full-sized half-wave plate 403 or half-sized half-wave plate 404, the polarization state of the light beam is rotated 90°, e.g., from p-polarized to s-polarized. For simplicity, in the embodiment illustrated in FIG. 4, the configuration of first birefringent beam displacer 401 is substantially identical to the configuration of second birefringent beam displacer 402, including physical dimensions and optical properties. In other embodiments, first birefringent beam displacer 401 and second birefringent beam displacer 402 may each have different optical and dimensional properties that are selected to provide the same optical processing of optical input signal 410 as described herein.

In operation, polarization management optics assembly 400 receives optical input signal 410 from optical input/output assembly 360 on surface 405 of first birefringent beam displacer 401. From surface 405, optical input signal 410 is split into a first component 410A and a second component 410B, which are initially s- and p-polarized, respectively, as indicated. First birefringent beam displacer 401 is oriented with respect to optical input signal 410 to direct s-polarized light, e.g., first component 410A, along an unaltered path and p-polarized light, e.g., second component 410B, along an angularly displaced path. Upon exiting first birefringent beam displacer 401, first component 410A and second component 410B return to parallel paths. Full-sized half-wave plate 403 the rotates the polarization state of first component 410A and second component 410B, so that first component 410A is p-polarized prior to entering second birefringent beam displacer 402 and second component 410B is s-polarized prior to entering second birefringent beam displacer 402. Thus, first component 410A follows an angularly displaced path through second birefringent beam displacer 402 and second component 410B passes directly through second birefringent beam displacer 402 without undergoing angular displacement. Upon exiting second birefringent beam displacer 402, first component 410A and second component 410B once again return to parallel paths. First component 410A then passes through half-sized half-wave plate 404 and is changed from p-polarized to s-polarized light. In this way, optical input signal 410, which has an arbitrary polarization state, is converted into two closely space, parallel light beams, i.e., first component 410A and second component 410B, having a single, known polarization state, i.e., s-polarized. Because the two parallel beams are closely spaced, the various active and passive optical elements of WSS 300 may treat these two beams as essentially one beam throughout WSS 300.

It is contemplated that optical input/output assembly 360 may only include second birefringent beam displacer 402 and half-sized half-wave plate 404 to convert optical input signal 410 into two closely spaced, parallel light beams. However, in such a configuration, the optical paths of first component 410A and second component 410B have different lengths, and may cause one or more of the following: polarization mode dispersion (PMD), polarization dependent losses (PDL), insertion loss due to optical aberration, and a decrease in the bandpass of the LC-based optical switching components of WSS 300 located "downstream" of polarization management optics assembly 400. Thus, full-sized half-wave plate 403 and first birefringent beam displacer 401 are included in polarization management optics assembly 400 so that the optical paths of first component 410A and second component 410B have substantially identical lengths.

While the foregoing is directed to embodiments of the present invention, other and further embodiments of the invention may be devised without departing from the basic scope thereof, and the scope thereof is determined by the claims that follow.

What is claimed is:

1. An optical device for processing a wavelength division multiplexing (WDM) signal, comprising:
    a light dispersing element for separating a first light beam containing an input WDM signal into its wavelength components and combining wavelength components of an output WDM signal to produce a second light beam containing the output WDM signal; and
    a fiber lens assembly with an optical fiber and a lens, wherein the lens is configured and positioned to optically couple the optical fiber and the light dispersing element,
    wherein the lens is positioned in an optical path of a first convergent light beam containing the output WDM signal and configured to produce a second convergent light beam containing the output WDM signal as the first convergent light beam travels along the length of the lens.

2. The optical device according to claim 1, wherein the lens has the same optical axis as the optical fiber, a diameter that is greater than a diameter of the optical fiber, and a focal length that is no more than two orders of magnitude greater than the diameter of the optical fiber.

3. The optical device according to claim 2, further comprising input and output ports, wherein the fiber lens assembly is implemented in at least one of the output ports.

4. The optical device according to claim 3, wherein the light dispersing element comprises a diffraction grating.

5. The optical device according to claim 3, wherein the light dispersing element comprises an arrayed waveguide grating.

6. The optical device according to claim 1, further comprising at least one optical element disposed in an optical path between the fiber lens assembly and the light dispersing element.

7. The optical device according to claim 1, wherein an alignment gap is provided between the optical fiber and the lens.

8. The optical device according to claim 1, wherein the diameter of the lens is 2 to 6 times greater than the diameter of the optical fiber.

9. The optical device according to claim 1, wherein the lens physically abuts the optical fiber.

10. The optical device according to claim 1, wherein the lens has the same optical axis as the optical fiber, and the optical axes of the lens and the optical fiber are misaligned with respect to an optical axis of the first convergent light beam.

11. The optical device according to claim 1, further comprising:
a second fiber lens assembly implemented in at least one of the input ports, the second fiber lens assembly having an optical fiber and a lens,
wherein the lens of the second fiber lens assembly is positioned in an optical path of a light beam containing the input WDM signal and transmitted through the optical fiber of the second fiber lens assembly, and configured to produce a divergent light beam containing the input WDM signal when the light beam exits the lens of the second fiber lens assembly into free-space.

12. The optical device according to claim 1, wherein the lens in the fiber lens assembly is positioned proximate the optical fiber.

13. An optical device for processing a wavelength division multiplexing (WDM) signal, comprising:
a light dispersing element for separating a first light beam containing an input WDM signal into its wavelength components and combining wavelength components of an output WDM signal to produce a second light beam containing the output WDM signal; and
a fiber lens assembly with an optical fiber and a lens, wherein the lens is configured and positioned to optically couple the optical fiber and the light dispersing element,
wherein the lens has the same optical axis as the optical fiber, a diameter that is greater than a diameter of the optical fiber by 2 to 6 times, and a focal length that is no more than two orders of magnitude greater than the diameter of the optical fiber, and
wherein the lens is positioned in an optical path of a first convergent light beam containing the output WDM signal, and is configured to produce a second convergent light beam containing the output WDM signal as the first convergent light beam travels along the length of the lens and to couple the second convergent light beam into the optical fiber.

14. The optical device according to claim 13, further comprising input and output ports, wherein the fiber lens assembly is implemented in at least one of the output ports.

15. The optical device according to claim 13, further comprising an optical switch for receiving the wavelength components, altering the optical paths of the wavelength components, and directing the wavelength components to the light dispersing element after their optical paths have been altered.

16. The optical device according to claim 13, wherein the optical axes of the lens and the optical fiber are misaligned with respect to an optical axis of the first convergent light beam.

17. The optical device according to claim 13, wherein the lens in the fiber lens assembly is positioned proximate the optical fiber.

18. The optical device according to claim 13, wherein the lens in the fiber lens assembly is physically abutting the optical fiber.

19. The optical device according to claim 13, wherein an alignment gap is provided between the optical fiber and the lens.

* * * * *